Figure 15:
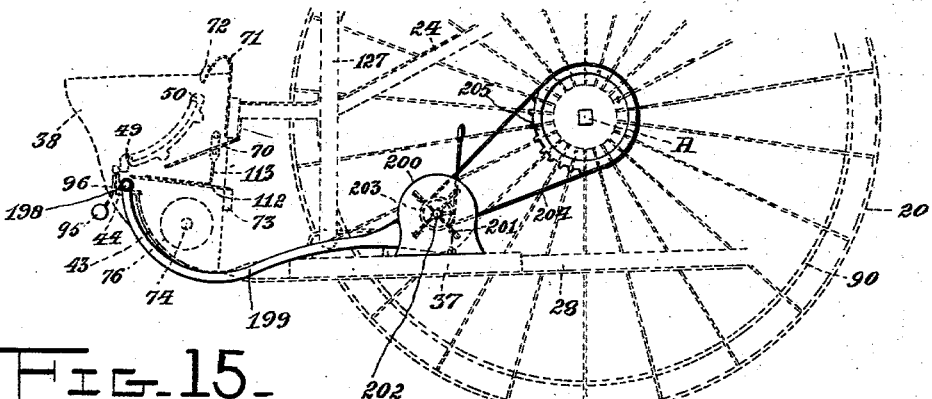

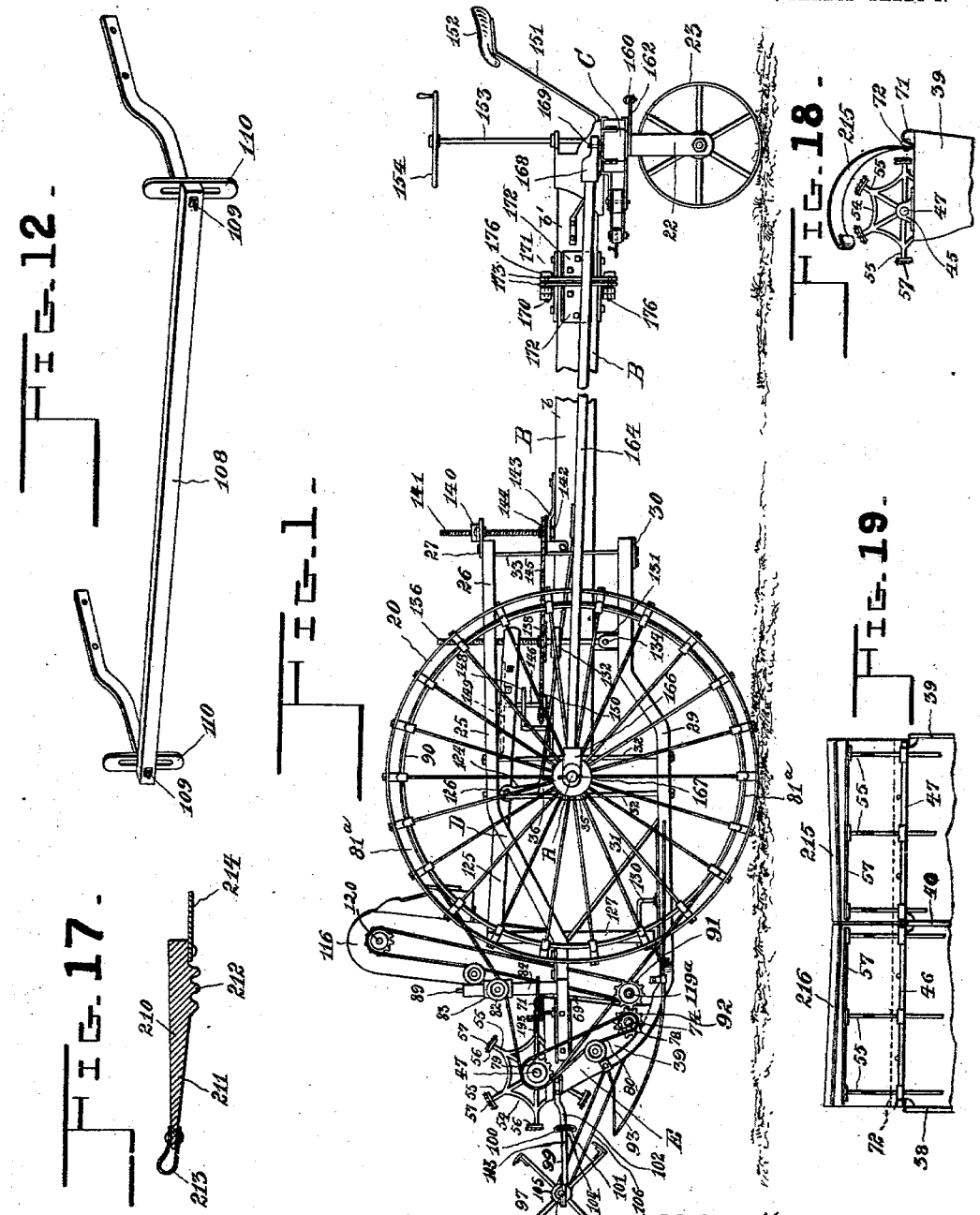

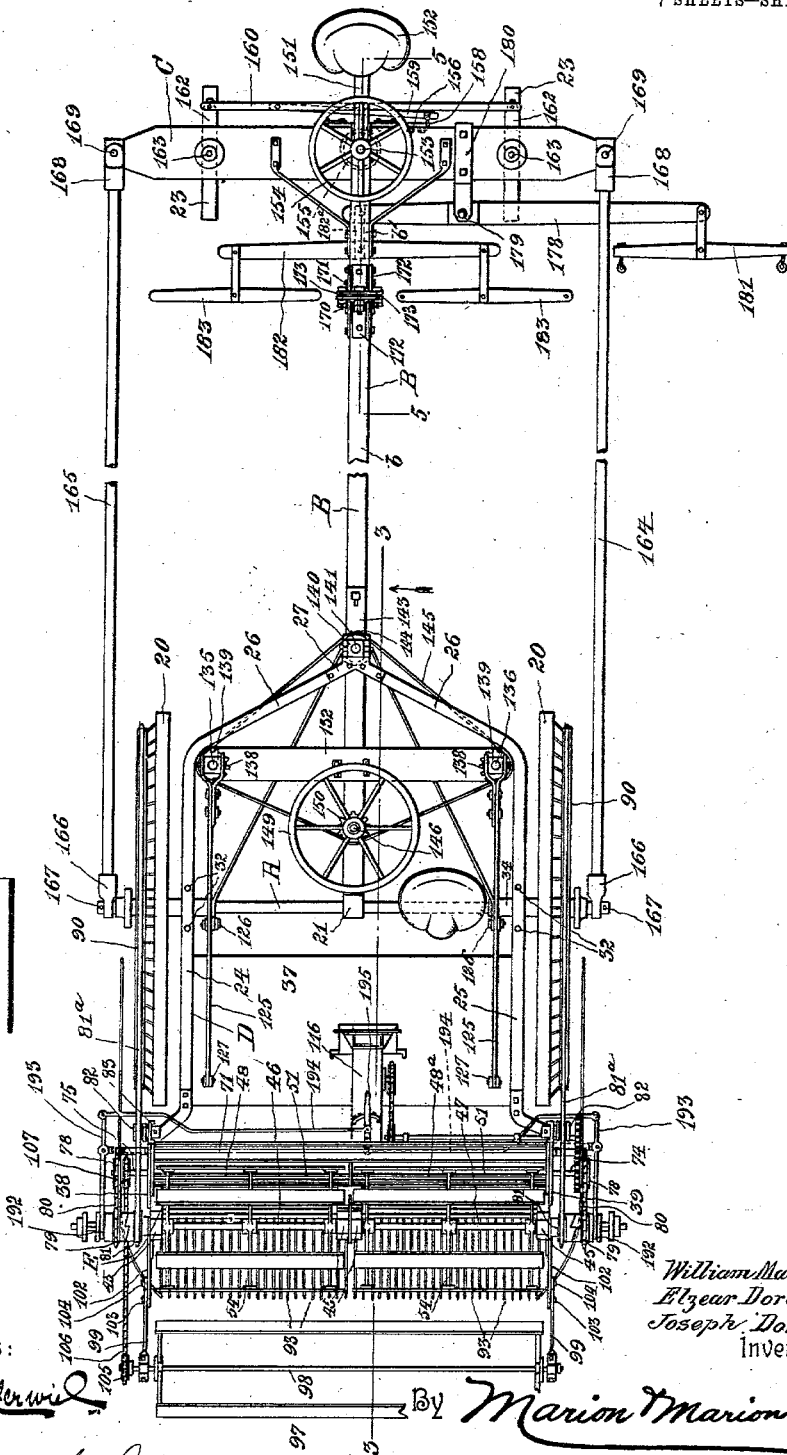

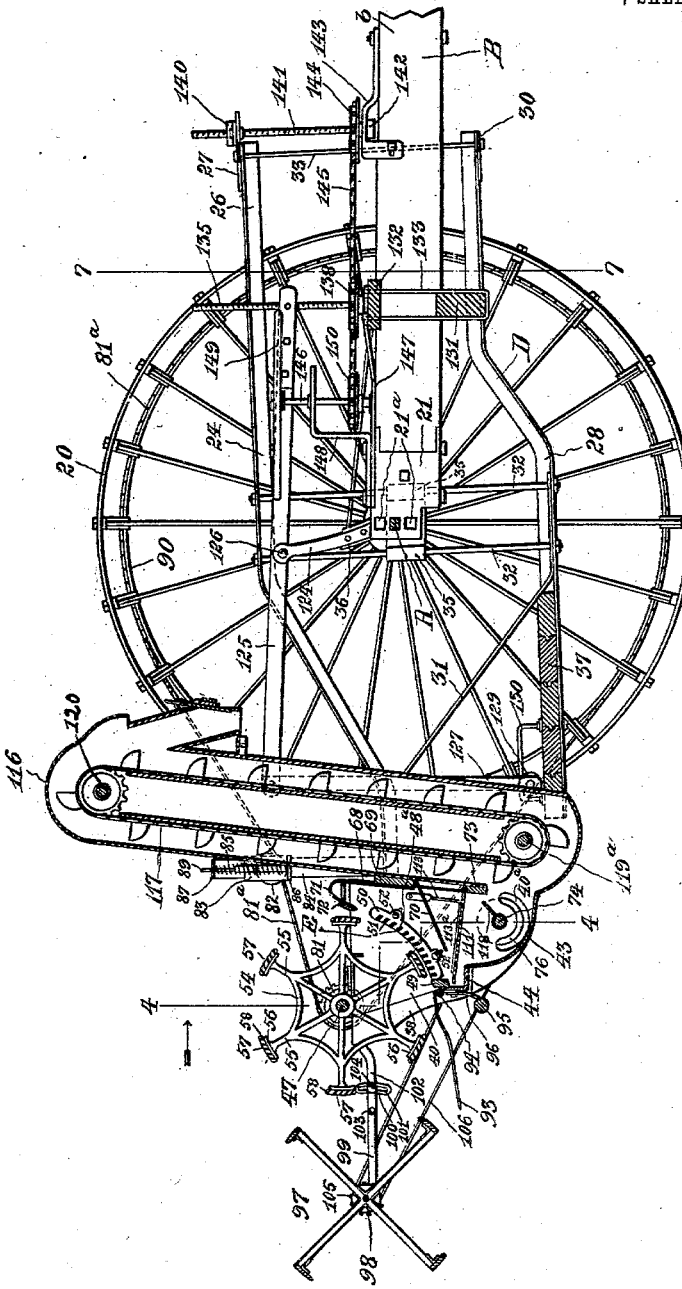

No. 717,588. PATENTED JAN. 6, 1903.
W. MALONEY & E. & J. DORÉ.
GRAIN THRESHING MACHINE.
APPLICATION FILED JULY 10, 1900.
NO MODEL. 7 SHEETS—SHEET 4.
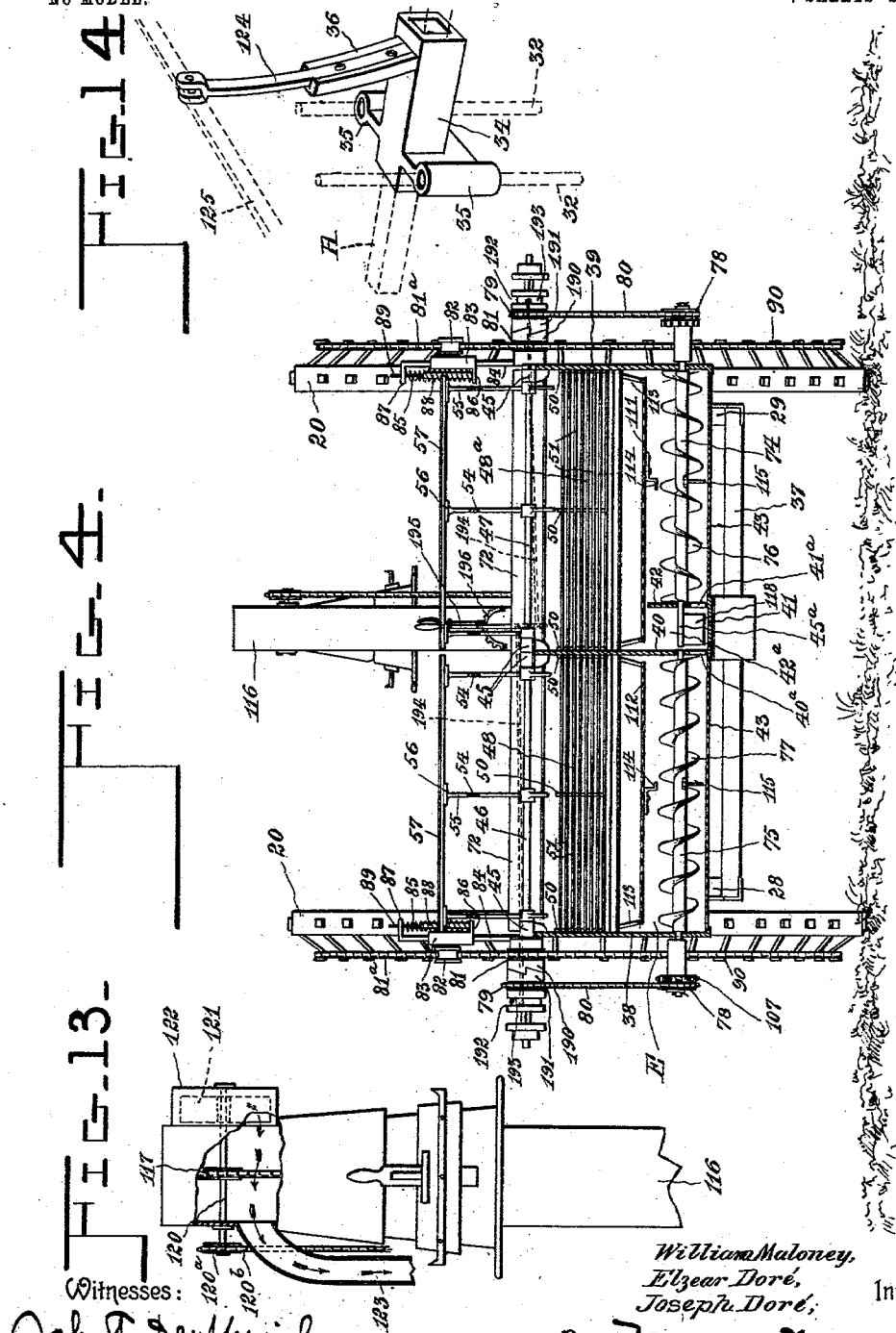
Witnesses:
John T. Deufferwil
W. F. Bernhard
William Maloney,
Elzear Doré,
Joseph Doré,
Inventors
By Marion & Marion
Attorneys No. 717,588. PATENTED JAN. 6, 1903.
W. MALONEY & E. & J. DORÉ.
GRAIN THRESHING MACHINE.
APPLICATION FILED JULY 10, 1900.
NO MODEL.
7 SHEETS—SHEET 5.
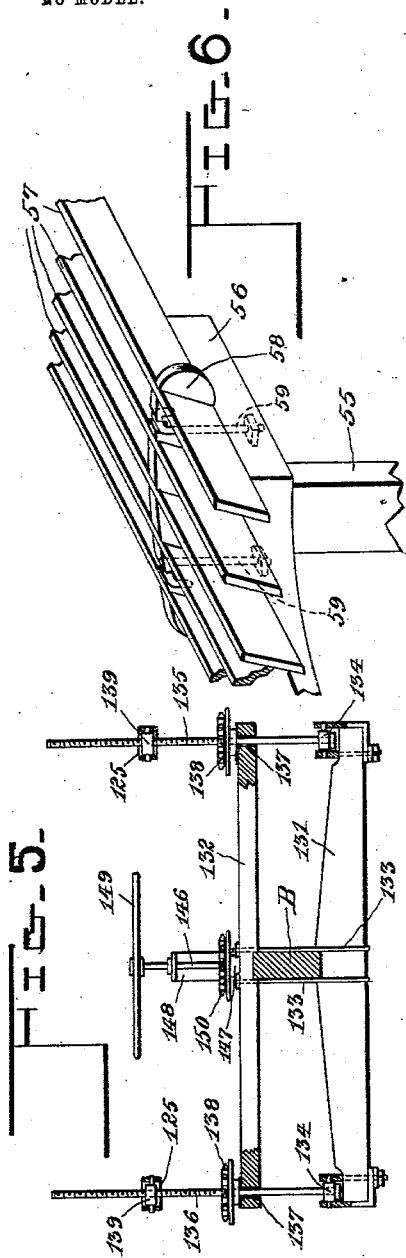
Witnesses:
William Maloney,
Elzear Doré,
Joseph Doré,
Inventors
By Marion & Marion
Attorneys

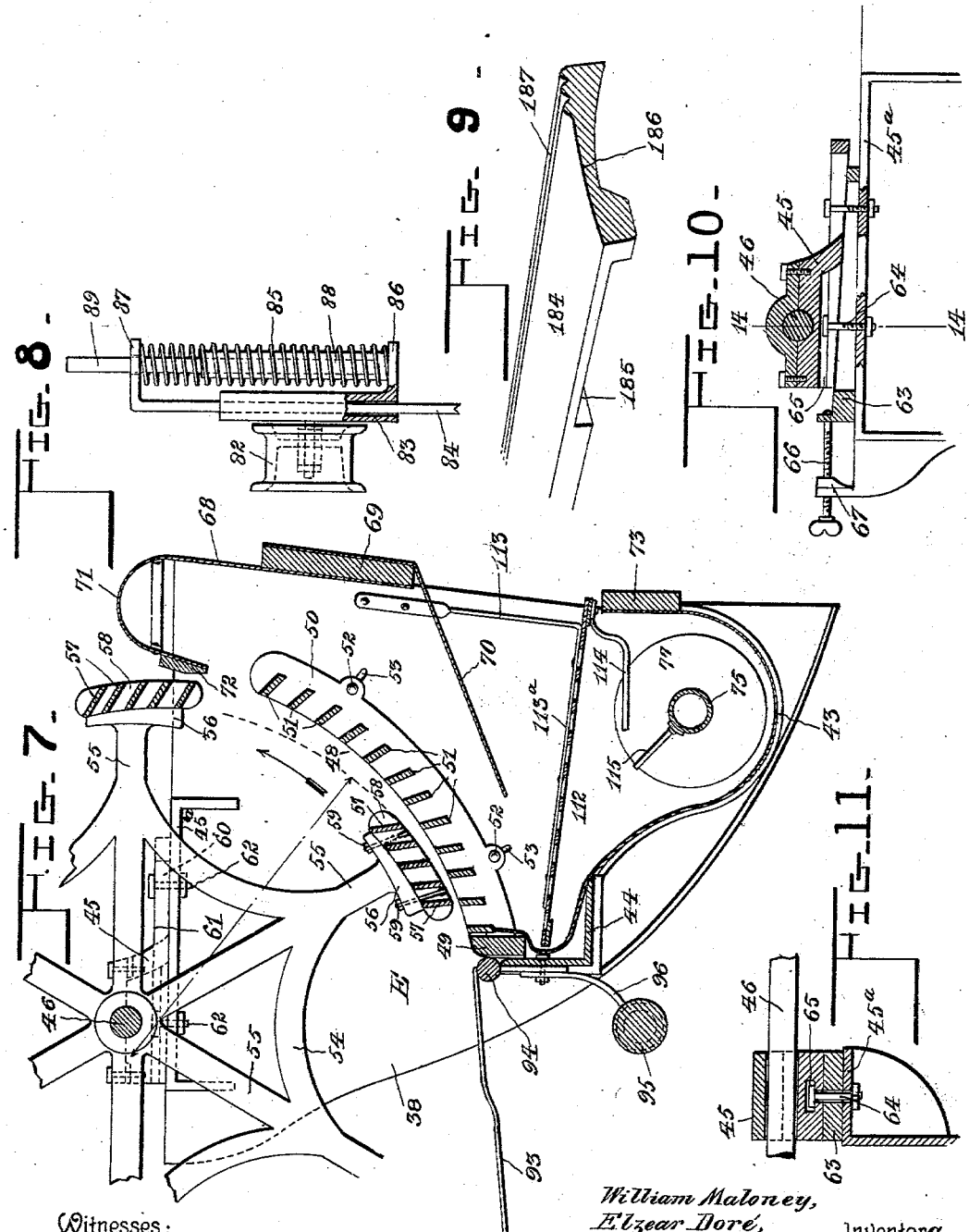

No. 717,588. PATENTED JAN. 6, 1903.
W. MALONEY & E. & J. DORÉ.
GRAIN THRESHING MACHINE.
APPLICATION FILED JULY 10, 1900.
NO MODEL. 7 SHEETS—SHEET 7.

Witnesses:

Inventors
William Maloney,
Elzear Doré,
Joseph Doré,

By Marion Marion
Attorneys

UNITED STATES PATENT OFFICE.

WILLIAM MALONEY, ELZEAR DORÉ, AND JOSEPH DORÉ, OF LAPRAIRIE, CANADA, ASSIGNORS, BY DIRECT AND MESNE ASSIGNMENTS, TO SAID MALONEY, MAXWELL S. INGLIS AND ISAAC PITBLADO, THE LATTER TWO AS INDIVIDUALS AND AS TRUSTEES, OF WINNIPEG, CANADA.

GRAIN-THRESHING MACHINE.

SPECIFICATION forming part of Letters Patent No. 717,588, dated January 6, 1903.

Application filed July 10, 1900. Serial No. 23,113. (No model.)

*To all whom it may concern:*

Be it known that we, WILLIAM MALONEY, ELZEAR DORÉ, and JOSEPH DORÉ, subjects of Her Majesty the Queen of Great Britain, residing at Laprairie, in the county of Laprairie, Province of Quebec, Canada, have invented certain new and useful Improvements in Grain Harvesters and Threshers; and we do hereby declare that the following is a full, clear, and exact description of the invention, such as will enable others skilled in the art to which it appertains to make and use the same.

Our invention is a machine for harvesting and threshing grain directly from the standing stalks—that is to say, the machine is of a type designed to remove the kernels of wheat without cutting off the heads of the stalks or cutting down the standing stalks themselves, so that the stalks and the heads will be left standing in the field which is traversed by our machine, whereby the grain may be harvested more economically and expeditiously than by prevailing methods, because we omit the usual steps of cutting down the stalks and binding them into sheaves, stacking the sheaves into a shock, threshing the grain out of the heads, and cleaning the grain from chaff and short straws at the threshing operation.

One part of our machine is an improved threshing mechanism so arranged as to gradually and easily bring the head of the standing grain into position between the cylinders and concaves for the purpose of threshing out the kernels of grain without cutting or crushing the standing stalk or removing the head from the stalk. The machine is constructed and proportioned to operate a swath, which may vary from six to ten feet, more or less, and to insure the best results in the operation of the machine and on its steady advancement across the fields we have divided the threshing mechanism into two sections by employing a pair of concaves and a pair of cylinders, the latter being individually and rapidly driven by connection with the traction-wheels of the machine. By dividing the cylinder into two sections and by employing individual driving devices therefor the use of an elongated cylinder disproportioned to the length of the machine is dispensed with and a better effect on the grain in the threshing operation and economy of power requisite for the rotation of the cylinders are obtained.

Our machine also contemplates the provision of means by which the height of the threshing mechanism may be varied with relation to the surface of the ground for the purpose of adjusting said mechanism to standing grain of different heights, while at the same time other important considerations are held in view—*i. e.*, first, the maintenance of the whole machine in a level condition at all points of adjustment of a threshing mechanism in order to obtain the best results in threshing out the grain from the heads of the standing stalks, and, secondly, the provision of an adjusting mechanism which will counteract the effect of the heavy threshing mechanism at the front end of the machine on the remainder or rear portion of the machine.

Further objects of the invention are to simplify the construction and provide for the economical renewal of parts of the threshing mechanism, to provide means for carrying the threshed grain to a bagging mechanism, to blow out chaff and refuse from the threshed grain, to minimize the loss of grain during the harvesting and threshing operations, and to render easy of operation the devices which adjust the threshing mechanism vertically.

The novelty in the combination of mechanisms and in the construction of parts comprising such mechanisms and entering into the structure of the improved machine will be more fully hereinafter described, and defined by the claims.

In the accompanying drawings we have represented a harvesting and threshing machine which embodies the several mechanisms and features of our invention in their preferred form, and to these drawings we shall now refer in order to explain more clearly the nature of the invention and the manner in which the same is or may be carried into effect.

Figure 16:
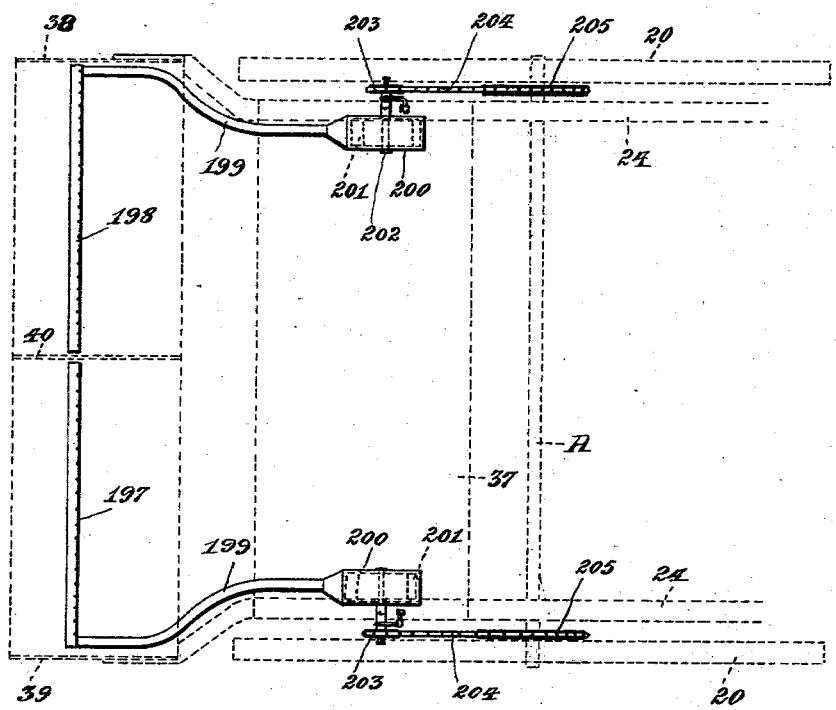

Figure 1 is a side elevation of our improved machine with a part of the tongue and one side draft-bar broken away. Fig. 2 is a plan view of the machine shown by Fig. 1 with the left-hand portion of the front beater-reel partly broken away. Fig. 3 is an enlarged vertical section through the front portion of the machine, taken in the plane indicated by the dotted line 3 3 on Fig. 2 looking in the direction indicated by the arrow. Fig. 4 is a vertical transverse sectional elevation taken in the plane of the dotted line 4 4 on Fig. 3 looking in the direction of the arrow and with the lower portion of the threshing-cylinders partly broken away. Fig. 5 is a vertical detail sectional elevation in the plane of the dotted line 7 7 on Fig. 3 to show certain details of the means for moving the vertically-adjustable frame that supports the threshing mechanism. Fig. 6 is an enlarged fragmentary detail perspective view of a portion of one threshing-cylinder, illustrating a portion of one series of bars with the means for clamping the same in place. Fig. 7 is an enlarged vertical detail section through the casing, a concave, a riddle or screen, a screw conveyer or auger, and a portion of one cylinder, the whole forming a part of the threshing mechanism. Fig. 8 is an enlarged detail in sectional elevation of a self-adjusting tightener adapted to keep taut one of the sprocket-chains between a threshing-cylinder and a driving-sprocket on the traction-wheel. Fig. 9 is a fragmentary detail view of another embodiment of threshing-bar, which may be used on the threshing-cylinders. Fig. 10 is a detail sectional elevation of a modified construction of means for adjusting the shafts of the threshing-cylinders, and Fig. 11 is a detail section on the line 14 of Fig. 10. Fig. 12 is a detail perspective view of a beater-bar which may be supported in advance of the threshing-cylinders by taking the place of the beater-reel. Fig. 13 is a detail elevation, partly in section, of the elevator for the threshed grain, illustrating one form of blower mechanism by which a current of air may be forced through the falling grain, so as to cleanse the latter of the chaff and other impurities. Fig. 14 is a detail perspective view of one guide-boxing adapted to be fitted on the main axle and receive guide-bars of the vertically-adjustable frame and support the standards in which are hung the levers by which the adjustable frame may be raised or lowered. Fig. 15 is a side view of another means for blowing air through falling grain, showing certain parts of the main machine by dotted lines. Fig. 16 is a plan of the parts shown by Fig. 15. Fig. 17 is a cross-sectional view of another form of beater-bar contemplated by this invention. Fig. 18 is an end view on a greatly-reduced scale, illustrating a portion of one threshing-cylinder and the overhanging hood therefor; and Fig. 19 is a diagrammatic side view of the two threshing-cylinders and the overhanging hoods therefor, illustrating the inclination of such hoods toward the middle of the machine.

The same letters and numerals of reference are used to indicate like parts in each of the several figures of the drawings.

The main carrying-axle A of the machine is arranged between the threshing mechanism and the means for steering the entire apparatus from the rear. The main tongue B extends longitudinally of the machine from the axle A to the rear transverse beam C, the latter serving to support certain parts of the steering mechanism. The traction-wheels 20 are journaled loosely on the axle A, near the end portion thereof, and the axle remains stationary and is non-revoluble together with the tongue B and the transverse beam C; but the traction-wheels are free to rotate on the axle, so as to furnish a proper means of supporting the weight of the machine on advancement of the latter across the field, and also to furnish the motive power for the operation of the threshing mechanism and the several mechanisms associated therewith. The front end of the tongue B is united solidly or firmly to the main axle by a casting 21, (see Fig. 3,) which is fitted to and secured firmly on said tongue, said casting having a vertical series of transverse openings 21ª, in which may be fitted said axle A, whereby the tongue may be supported by the axle at different heights above the ground. The traction-wheels 20 are quite large in diameter, as shown by the drawings, and they support the entire weight of the heavy front part of the machine; but the lighter rear part of the machine is borne by the caster or steering wheels 23, the latter being disposed below the transverse beam C.

The threshing mechanism and the several mechanisms intimately related thereto are disposed at the front end of the machine in advance of the axle A and substantially well forward of the traction-wheels 20. To properly support these mechanisms in a position for harvesting the grain as the machine is propelled or shoved across the field and also to provide for the adjustment of the threshing mechanism and the several other devices which will be referred to in a vertical direction in order that the mechanisms may be adjusted according to the height of the standing grain, we have devised a vertically-adjustable frame, which in its entirety we have indicated by the letter D in the several figures of the drawings. This vertically-adjustable frame consists of two main upper and lower parts connected by a plurality of vertical rods that serve to guide the movement of the frame. The upper part of this frame D consists of metallic bars 24 25, arranged in horizontal positions parallel to each other between the traction-wheels 20 and over the axle A, the rear portion of these upper bars being united by the inclined bars 26, which converge toward each other and are coupled together by the connecting plate or plates 27. (See Fig. 2.) The lower main part of this vertically-adjustable frame is composed of the side bars 28 29, arranged in positions corresponding to the bars 24 25, but below the main axle A, said lower side bars being united by a rear cross plate or bar 30. The bars constituting the upper and lower main portions of this frame are braced by the stays 31 and by the employment of the pairs of vertical rods 32 and 33. A pair of the vertical rods 32 connects the upper and lower bars at each side of the frame D, and thus there are two pairs of the rods 32, one on each side, but the rods 33 are disposed in a single pair at the rear portion of the frame, so as to connect the plates 27 and the cross plate or bar 30. By reference to Figs. 1 and 3 it will be noted that the upper bars 24 25 of the frame are bent downwardly at the front portions for the purpose of fastening the casing for the threshing mechanism thereto, while the lower bars 28 29 of said vertically-adjustable frame are bent upwardly at points intermediate of their length. The pairs of vertical rods 32 at the sides of the frame D are fitted slidably in the sleeves 35 of the guide-boxings 34, the latter being fitted on the axle A on opposite sides of the tongue and near the traction-wheels. One of the guide-boxings is shown by Fig. 17 of the drawings as having an upstanding post 36, to which is secured a standard, presently described, for supporting one of the levers by which the frame D is adjusted. It will be noted that the sleeves 35 of the two guide-boxings are disposed on opposite sides of the axle and on opposite sides of the central tongue, and as the pairs of rods 32, which join the upper and lower members of the frame D together, are fitted in these sleeves of the guide-boxings it follows that the frame D is limited to vertical adjustment only, so that it will maintain all the parts of the threshing mechanism in the proper horizontal positions. In other words, the frame D is not capable of a tilting or swinging adjustment, but while it is capable of movement in a vertical plane said frame and its contained mechanisms will remain in a horizontal plane and parallel to the ground-line. The bars 28 29 at the lower front portion of the frame D carry the platform 37, on which an attendant may be stationed in the operation of the machine in the field.

For the purpose of properly supporting the concaves, the shaking-riddles, and the grain-conveyers of the threshing mechanism, as well as to sustain the revoluble threshing-cylinders, we employ what may be termed as the "casing," which is indicated by the reference-letter E in its entirety in Figs. 3, 4, 7 as well as in Figs. 1 and 2. This casing consists of cast-metal end plates 38 39, a similar middle plate 40, and a bottom 43, preferably of sheet metal, the plates being more clearly indicated by Fig. 4 and the bottom by Figs. 3 and 7. As shown by Fig. 4, the middle plate 40 has an integral offset 41 and a flange 42, arranged to form an intermediate compartment 42$^a$, into which the threshed grain is delivered by the oppositely-arranged screw conveyers, presently described. The metallic bottom 43 is bent to form troughs for the screw conveyers, as shown by Figs. 3, 4, and 7, and this bottom extends from the threshing-concaves to the rear edge of the casing in order to catch all the grain which passes through the concaves and the riddles. The metallic end plates 38 39 are disposed in vertical parallel positions, and they are secured firmly to the front ends of the bars 24 25 of the adjustable frame D. These end plates are joined or connected together by transverse elements, one of which is an angle-bar 44, that is disposed at the front edge of the casing, said angle-bar being solidly united to the end and middle plates, which form parts of the casing E. The end and middle plates of the casing are provided, furthermore, with the shaft-bearings 45 for the shafts 46 47 of the divided or duplicate threshing-cylinders, said shafts being arranged in alinement to each other and transversely across the machine-frame.

Our threshing mechanism contemplates the employment of two concaves, which are indicated by the numerals 48 48$^a$, (see Figs. 3, 4, and 7,) one concave being arranged between the end plate 38 and the middle plate 40, while the other concave lies between the plates 39 40. Each concave consists of a series of curved plates 50 and a series of slats or bars 51, the latter being secured in any approved way to the curved bars 50 and disposed parallel to each other and longitudinally of the casing. The curved bars 50 of each concave are attached to a front rail 49, and the end bars of the concave, which lie next to the plates 38 39 40 of the casing, are held in place by means of bolts 52, which pass through slots 53, whereby the concave may be adjusted with relation to the beaters on the rotary cylinder. The threshing mechanism also includes two cylinders, which are disposed in operative relation to the respective concaves and are carried by the cylinder-shafts 46 47. Each cylinder consists of a series of spiders 54, secured at proper intervals to one cylinder-shaft, and each spider has a plurality of short radial arms 55, which are equipped with or terminate in the wedge-shaped heads 56, (see Fig. 7,) the curved outer face of each head 56 lying in an arc eccentric to the axis of the cylinder-shaft for a purpose to be hereinafter described. The arms 55 of the series of spiders used in one cylinder are arranged in corresponding positions, so as to bring the heads 56 in the same plane, thus disposing the heads in a manner to apply thereto a plurality of series of threshing bars or slats 57. Each series of slats 57 extends longitudinally of the cylinder, so as to be applied against the series of heads 56, which occupy corresponding positions on the cylinder-spiders, and the slats of the series are applied edgewise against said heads 56, so that they may be secured in position by the series of clamping-plates 58. Referring to the detail views of Figs. 6 and 7, and particularly to the first-named figure, it will be noted that the clamping-plate 58 is notched to have engagement with notches in the threshing-slats 57, thus disposing the plate 58 flush with or below the active surface of the threshing-bars, and with the plate 58 engages a series of hooked bolts 59, which are fastened to the head 56. We have shown each cylinder as provided with six series of threshing-slats, each series of which consists of five slats; but it is evident that the number of slats in each series and the number of series on the cylinder may be varied as desired by the skilled constructor. It is to be observed by reference to Fig. 7 that the plurality of series of slats on each cylinder are adapted on the rotation of the latter to be presented successively to the concave; but there is a short measurable lapse of time intervening between the presentation of the successive series of slats on the cylinder, which is useful in permitting new heads of the standing stalks to enter the space between the cylinder and concave on the advancement of the machine, whereby the threshing mechanism is adapted to thresh the kernels of grains directly from the heads on the standing stalks.

From the foregoing description it is to be understood that the threshing-bars are not presented continuously by the cylinder to the concave. The slats 51 in each concave are arranged to present their edges in an arc of a circle, so as to form the working surfaces of the concave. In like manner each series of threshing-bars on the cylinder are fitted to one series of the heads 56 for the outer edges of said threshing-bars to lie in an arc of a circle, so as to form one of the series of working surfaces on each cylinder; but by reason of the application of each series of threshing-bars to the curved faces of one series of the heads 56, which faces lie eccentric to the surface of the concave, each series of threshing-bars are made to present their edges in a manner to lie in an arc eccentric to the working surface of the concave, all as will be more readily understood by reference to Fig. 7. This eccentric disposition of each series of threshing-bars on the cylinder to the working surface of the concave is an important feature of our invention, because the threshing-bars of the cylinder are made, when in opposing relation to the concave, as shown by Fig. 7, to present a space which increases in width from the heel toward the front of the threshing-surface formed by the series of bars on the cylinder. With the cylinder rotating in a direction indicated by the arrow in Fig. 7 each series of threshing-bars is caused to sweep against the stalks or heads of the grain as it approaches the concave, and by the time that the series of bars are brought in opposing relation to the concave the heads of the standing stalks will lie across the concave between the latter and the threshing-bars on the cylinder, whereby the threshing-bars of each series on the cylinder are made to act progressively or successively on the head of the grain in removing the kernels therefrom, because the bars of each series occupy positions wherein the edges lie closer and closer from the front to heel of the threshing-surface toward the concave.

In Fig. 7 of the drawings we have shown the bearing 45 for one cylinder-shaft slidably confined in slots 60 of a bracket 61, which is fastened to one of the flanged plates of the casing D. This shaft-bearing is confined in place by means of bolts 62, and the parts are arranged to secure an adjustment of the cylinder-shaft in a horizontal plane in order that the cylinder may be adjusted so as to vary the space between the working surfaces of the cylinder and of the concave. In Figs. 10 and 11, however, the slidable shaft-bearing 45 may be raised or lowered in a substantially vertical direction by the employment of a wedge-shaped adjusting-plate 63, which is interposed between the shaft-bearing 45 and the seat-flange 45ª on one of the metallic plates of the casing E. The shaft-bearing is held in place by the bolts 64, the heads of which occupy the channel 65 in the shaft-bearing, and to a bearing-lug 67 of the metallic plate is fitted an adjusting-screw 66, the latter having a loose engagement with a lug of the plate 63, whereby the screw may be manipulated for giving endwise movement to the plate in order to raise or lower the shaft-bearing, to the end that the cylinder may be adjusted to vary the space between its threshing-bars and the surface of the concave.

The rear side of the casing E is closed partly by a sheet-metal back 68, which is secured to a rear rail 69. The lower part of this back is extended in a forward and downward direction, so as to lie beneath the concave and form a forwardly-inclined deflecting-plate 70, which is arranged to catch a part of the grain that falls through the concave and to direct the grain in a forward direction toward the front of the machine and upon the riddle. The upper part of this metallic back is extended forward and downward to form the curved guard 71, having a front rail 72, disposed a little in rear of the path pursued by the threshing-bars on the cylinder, and this guard and this rail are arranged to overhang the concave, with the rail 72 lying a little above the uppermost slat on the concave, so as to form a space in which the grain is free to enter if it should be carried by the cylinder above the concave, thereby minimizing the loss of grain-kernels by the rapid rotation of the cylinder, because the guard has a tendency to catch the escaping grain. The metallic bottom 43 is extended at the rear of the casing to a plane above the screw conveyers, and the rear edge of this bottom 43 is fastened to a fixed rail 73 at the rear of the casing. Said rail 73 and the rail 69 are in spaced parallel relation to leave an opening above the plane of the trough for the screw conveyer, through which opening is adapted to be discharged the refuse and pieces of grain heads or stalks that may lodge upon the shaking-riddle, presently described.

74 75 designate the horizontal screw-shafts, which are arranged in the casing E at a suitable distance above the curved portions of the bottoms 43, which constitute the troughs, said screw-shafts being located below and to the rear of the two concaves of the threshing mechanism. These shafts are journaled in suitable openings or bearings of the metallic plates forming a part of the casing E, and the shaft 74 carries a spiral conveyer 76, the thread of which runs from right to left. The other shaft, 75, has a spiral conveyer 77, the thread of which runs from left to right, and thus the two conveyers are reversely disposed in order to convey the grain from opposite sides of the machine toward the middle thereof. The screw-shaft 74 is shorter than the screw-shaft 75, the latter being extended through the flange 42 of the middle plate 40, as indicated at 45$^a$, so as to lie in the compartment 42$^a$. (See Fig. 4.) In the middle plate 40, at the lower edge thereof, next to the metallic bottom 43, is an opening 40$^a$ and in the flange 42 is an opening 41$^a$, which openings are adapted to permit the grain to pass from the troughs of the screw conveyers into the compartment 42$^a$. The extended end 45$^a$ of the screw-conveyer shaft 74 carries a wing or blade 118, which is adapted to rotate in the compartment 42$^a$ and to throw or sweep the grain into the buckets of the elevator 117. The shafts of the screw conveyers are extended beyond the end plates 38 39 of the casing, and they have sprocket-gears 78 secured thereto, said sprocket-gears being substantially in alinement with sprocket-gears 79 on the cylinder-shafts 46 47, the described arrangement of parts permitting the sprocket-chains 80 to engage with the two sets of sprockets and to transmit the motion from the cylinder-shafts to the conveyer-shafts for the independent operation of the latter from the respective shafts of the two cylinders.

The cylinder-shafts 46 47 are provided with the sprocket-gears 81, with which are engaged the sprocket-chains 81$^a$, that are propelled by the large sprockets 90, fastened on the traction-wheels in any approved way. It will be observed that each cylinder-shaft is connected by chain-and-sprocket gearing to one traction-wheel and that the cylinder-shafts are thus independently driven by the two traction-wheels, said cylinder-shafts serving in turn to independently actuate the screw conveyers, whereby in the event of stoppage of one cylinder the other cylinder and its associated mechanisms will continue in operation. In order to take up the slack in the driving-chains between the traction-wheels and the cylinder-shafts, we employ self-adjusting tightening devices arranged to act separately on the chains. Each tightening device has a roll 82 loosely journaled on a vertically-reciprocable slide 83. (See Fig. 8.) This slide is properly fitted on a vertical post 84, which is secured to one of the end plates of the casing, (see Fig. 1;) but the slide and the roller are normally depressed by a coiled spring 85. The slide has a foot-piece 86, and the post has a head 87, the spring being arranged to engage at its opposite ends with said head and the foot-piece in order to normally depress the roller, so as to keep the chain tight. The spring is held in place by fitting it loosely around a sleeve 88, which is a part of the slide, and in this sleeve is fitted a rod 89, which passes through an opening in the head 87 of the post.

The threshing mechanism has a series of directing-fingers 93, arranged in the same horizontal plane and carried by a finger-bar 94, which is supported on or between the end and middle plates of the casing E. These fingers incline slightly downward from the lower front edges of the concaves, and the fingers serve to separate the standing stalks and permit the heads thereof to be carried by the action of the cylinder threshing-bars over the concave. A deflecting-roll 95 is arranged in a horizontal position below the fingers 93 and in rear of the front ends thereof. This roll is mounted or journaled in hangers 96, which are fastened to the angle-bar 44, and the purpose of this roll is to press or bear against the standing stalks on the advancement of the machine, whereby after the kernels of grain have been threshed from the heads by the action of the cylinders and concaves the deflecting-roll serves to force the stalks forward and withdraw the heads from the threshing mechanism, the lower closed part of the casing formed by the bottom 43 riding freely over the standing stalks.

97 designates a beater-reel which is disposed in a horizontal position in advance of the threshing-cylinders and in substantially the same horizontal plane therewith. This beater-reel has its shaft 98 journaled in suitable bearings on the bracket-arms 99, the latter being arranged at opposite ends of the cylinders and the reel. A pair of supporting-arms 102 is fastened to the opposite end plates 38 39 of the casing E to project forwardly beyond the latter, and these arms have the enlarged heads 100, in which heads are the curved slots 101. The bracket-arms 99 are each pivoted at 103 to one supporting-arm 102, and each bracket-arm is furthermore provided with a bolt 104, that passes through the slot 101 of the head 100 on the supporting-arm. The bolt 104 may be tightened in order to firmly clamp the bracket-arm 99 in place; but the bolt may be loosened, so that the bracket-arm may be turned on the pivot 103 to raise or lower said arm 99, after which the bolt should be tightened to again clamp the bracket-arm in place. It is evident that the two arms 99 may be shifted in order to vary the height of the beater-reel with relation to the threshing-cylinders. A sprocket-gear 105 is secured to one end of the shaft of the beater-reel, and around this gear passes a chain 106, that also engages with a sprocket-gear 107 on the screw-conveyer shaft 75, whereby the beater-reel is driven by one conveyer-shaft, which is propelled from one cylinder-shaft.

In Fig. 12 of the drawings we have shown a modified construction of a cylinder-bar which is adapted to take the place of one series of slats on a series of the heads 56 of the cylinder. This bar is designated by the numeral 184, and it is provided on its under or neutral side with a seat 185, adapted to receive one of the heads 56, said bar being secured in place by bolts, screws, or other suitable fastenings. This beater-bar is adapted to be secured to the cylinder in the same relation as the series of threshing-bars, and it presents a broad smooth working face 186 and a corrugated face 187 in eccentric relation to the concave, so as to secure the advantageous effect of making the working surface operate gradually on the heads of the standing stalks. This beater-bar is the equivalent for the threshing-beam, because it acts in the same way and for the same purpose; but it is also advantageous in that its broad imperforate surface 186 prevents the kernels of grain from flying out of the threshing mechanism under the action of the threshing-corrugations 187.

In lieu of the rotary beater-reel we may employ the bar 108, which is fastened by the bolt 109 to the slotted heads 110 of the supporting-arms, all as shown in Fig. 12. This bar is arranged in advance of the threshing-cylinders in order to bend over the heads of the standing stalks, and the bar may be adjusted independently of the cylinders, so as to vary its position with relation thereto, and thus adapt the bar to the different heights of grain.

Below the concaves 48 48$^a$ are arranged the shaking-riddles 111 112, reference being made particularly to Figs. 3, 4, and 7. Each riddle is arranged within the chamber formed by the casing E, so as to lie above the screw conveyer. The riddle is furthermore disposed below the deflecting-plate 70 and is inclined in a downward and rearward direction from the front part of the concave toward the opening provided between the rails 69 73. Each riddle is supported by a pair of spring-hangers 113, which are bent to form the footpieces 113$^a$, that extend across the riddle and are secured firmly thereto, (see Fig. 7,) the upright parts of the hangers being fastened to the plates of the casing. A finger 114 is secured to each riddle so as to depend from the under side thereof and to lie in the path of a driving-arm 115, which is secured on the shaft of one screw conveyer. On the rotation of this driving-arm the finger 114 is struck to move the riddle and vibrate the hangers, whereby the riddle is shaken or agitated in order to cause the threshed grain to pass therethrough, while the refuse is discharged over the lower rear edge of the reel.

We have equipped the machine with an elevator mechanism designed to carry up the threshed grain for deposit into bags or other receptacles. The boot or casing 116 of the elevator is erected in a slightly-inclined position on the casing E, nearly at the middle thereof, and to the rear of the threshing mechanism. The foot of this elevator-casing is arranged to communicate with the compartment 42$^a$, into which the grain is delivered by the right and left screw conveyers, and from this compartment the grain is thrown by the wing or blade 118 into the buckets of the endless elevator 117. The driving-shaft 119 of this endless elevator extends to one side of the machine, so that it may be provided with a gear-wheel 91, which has intermeshing engagement with the gear-wheel 92 on the shaft 74 of the screw conveyer 76, whereby the elevator is positively driven from one of the screw conveyers. The elevator-boot 116 may be equipped with any suitable means for suspending the bags or sacks and with a valve or cut-off to control the outflow of the grain; but as these details do not enter into our invention we have not considered it necessary to illustrate and particularly describe the same.

Under some conditions of service we may find it desirable to subject the threshed grain to a blast of air while the grain is in a falling condition for the purpose of blowing out any chaff that may remain in the grain. This operation of blowing out the chaff may take place just prior to the deposit of the grain in the bag or sack; and in Fig. 13 of the drawings we have shown one embodiment of means whereby this operation may be effected. The upper shaft of the grain-elevator 117 is indicated by the numeral 120 and as having one end extended into a fan-casing 122, which is applied or secured laterally to one side of the elevator-boot 116. The end of the shaft 120 within the fan-casing is equipped with a fan or blower 121, and to the other end of this shaft 120 is secured a sprocket-gear 120$^a$, which is engaged by a sprocket-chain 120$^b$, driven from the lower shaft 119. A refuse-discharge spout 123 is secured to one side of the elevator boot or casing opposite to the side on which the fan-casing 122 is secured, and this spout 123 has communication with the upper part of the boot 116 at a point below the shaft 120 and opposite to the port by which the blast of air is blown from the fan 121 through the boot 116 and the falling grain to find its exit with the refuse through the spout 123. This spout may be carried below or to the rear of the grain-elevator for the purpose of discharging the chaff and refuse at a suitable point in rear of the threshing mechanism.

We will now proceed to describe the means by which the frame D, which carries the threshing mechanism, may be raised or lowered and maintained in a level position at all points of its adjustment, such adjusting mechanism being capable of manipulation easily by one man, notwithstanding the heavy weight of the threshing mechanism and the allied devices.

To the posts 36 on the guide-boxings 34, which are threaded on the main axle, are firmly secured the short standards 124, and in the upper ends of these standards are mounted the levers 125, each lever being arranged in an approximately horizontal position and fulcrumed at a point intermediate of its length, as at 126. To the front ends of these levers 125 are pivoted the upper ends of the hanger-links 127, the lower ends of which are connected in any suitable way to the lower part of the vertically-adjustable frame D. As one means for connecting the hanger-links to the vertically-adjustable frame, we have shown the rollers 129 loosely mounted on the lower ends of the hanger-links, and these rollers engage with the keepers 130, which are fastened to the platform 37 at the lower part of the frame D. It will therefore be understood that the vertically-adjustable frame which wholly supports the threshing mechanism and kindred devices is suspended by the hanger-links from the front end of the levers 125, and it is to be easily seen that the movement of these levers will operate to raise or lower the frame D and the mechanisms thereon. The rollers of the hanger-links are free to have a limited movement on the keepers in order to compensate for the adjustment of the levers 125 in an arc of the circle when raising or lowering the frame D, and thus the threshing mechanism and the parts on the frame D are kept in horizontal positions, whereby the entire machine remains in a level position at all points of adjustment of the frame D. The means for moving the levers 125 simultaneously and equally are now to be described.

A horizontal transverse beam 131 is applied to the under side of the tongue at a point in rear of the axle, and immediately over this beam 131 is arranged a similar beam 132, the parts being made fast to the tongue by the straps or bolts 133. The lower beam 131 is provided with the pivotal bearings 134, in which are stepped a pair of vertical screw-spindles 135 136, the same being free to rotate in the pivotal bearings and also passing loosely through vertical openings 137 in the end portions of the beam 132, reference being had more particularly to Fig. 5. Each screw-spindle 135 136 is provided with a sprocket-wheel 138, which is made fast with the spindle, so as to turn the latter, and each spindle has threaded engagement with a female-threaded nut 139, which is mounted in the rear end of one lever 125, it being understood that the two spindles 135 136 have threaded engagement with the two nuts carried by the two levers 125. A nut 140 is made fast with the plates 27, which connect the upper bars 24 25 at the rear upper portion of the frame D, and in this nut works a central screw-spindle 141, the latter having a foot 142, which works loosely in a bracket 143, mounted on the tongue B. This central screw-spindle is arranged in rear of and in a plane midway between the side screw-spindles 135 136, and on this spindle 141 is secured a sprocket-gear 144, that is in the same horizontal plane as the sprocket-gear 138, thus disposing all the gears on the screw-spindles for engagement by a single endless chain 145, which also engages with a sprocket 150 on a vertically-adjusting spindle 146. This spindle 146 is stepped in a foot-bearing 147 and supported in part by a standard 148, both secured on the tongue B at a point in rear of the axle A, and the upper extremity of this adjusting-spindle is furnished with a hand-wheel 149, which is disposed within convenient reach of an attendant standing on the platform 37. It is evident that the rotation of the spindle 146, through the medium of the hand-wheel, operates to propel the endless chain 145, so as to simultaneously turn the series of three screw-spindles 135, 136, and 141, the spindles being rotated at uniform speed. The spindles 135 136 operate on the nuts which are carried by the levers 135 for the adjustment of said levers and the frame D with the mechanisms thereon; but the spindle 141 engages with the nut 140, which is mounted directly on the rear upper portion of the frame D. This spindle 141 and its cooperating nut is an important feature of our adjusting mechanism, because these parts serve as an adjustable connection between the rear part of the frame D and the tongue B in order to counteract the heavy weight of the threshing mechanism at the front end of the machine, and this adjustable connection is operated simultaneously with the other screws and nuts which serve to directly influence the levers 125, which effect the vertical adjustment of the frame D.

The sprocket-gear 81 is fitted loosely on its proper shaft of the threshing-cylinders and it is provided with a clutch-face 190, as shown by Fig. 4. The sprocket-gear 79 is fitted on the same shaft as the gear 81, and it is likewise provided with a clutch-face 191, which is adapted to have engagement with the clutch-face 190 of the gear 81, said gear 79 being keyed, splined, or feathered to the threshing-cylinder shaft. It will be recalled that the sprocket-gears 81 of the threshing-cylinder shafts are driven by the chains 81ª from the traction-wheel, and when the gears 79 are clutched to the gears 81 the motion of the chains 81ª and the traction-wheels is transmitted to the threshing-cylinders; but it sometimes becomes desirable to throw the threshing mechanism out of service, as when traveling along roads or going to and from a field. We have provided means by which the sprocket-gears 79 on the two threshing-cylinder shafts may be simultaneously disengaged from the sprocket-gears 81 to throw the cylinders out of service. The gears 79 are grooved at 192 to receive the ends of the shipping-levers 193, (see Figs. 2 and 4,) said levers being disposed in horizontal positions at the sides of the machine and fulcrumed to any suitable supports. To the rear ends of these shipping-levers 193 are connected the links 194, which extend inwardly to an operating-lever 195, which for convenience may be supported on the boot or casing 116 of the elevator. These links or pitmen 194 are indicated by dotted lines in Fig. 4 and partly in full lines and partly in dotted lines by Fig. 2. It is evident that the lever 195 may be provided with a latch adapted to engage with a segment 196, fixed on the elevator-boot, in order that the lever and the gears 79 may be held in their adjusted positions.

The blast mechanism for blowing the chaff and refuse out of the grain, which we have shown as applied to the elevator in Fig. 13 of the drawings, may be dispensed with, and in lieu thereof we may employ the blast devices shown by Figs. 15 and 16 of the drawings. In this embodiment of the invention we employ two perforated blast-pipes 197 198, which are disposed at the front edges of the shaking-riddles 111 and 112 within the casing-bottom 43, each pipe having its blast-openings facing in a direction to direct the air-blast beneath and toward the rear edge of the riddle, whereby the blast will be forced through the falling grain after it leaves the riddle and before it is deposited in the trough within which operates the screw conveyer. Each blast-pipe is provided at one end with a branch 199, which is coupled to the casing 200 of a blast-fan 201, said casing being supported on the platform 37 or any other suitable part of the machine. The shaft 202 of this fan is provided with a clutch-controlled gear 203, around which passes the sprocket-chain 204, which is fitted to a large sprocket-gear 205 on the traction-wheel. The sprocket-gears 203 205 are properly proportioned to secure the desired speed of the fan in order to generate the blast required for blowing the chaff out of the grain. It will be noted that we employ separate fans, blast-pipes, and driving-gears for the fans in connection with the separate riddles which are associated with the individual threshing concaves and cylinders.

The operation of the several mechanisms entering into the improved harvester and thresher has been given in connection with the construction of said mechanisms; but the general operation of the machine may be recited briefly as follows: The machine is propelled across the field by the team of draft-animals, and the several mechanisms are set in operation in a manner as will be readily understood. The threshing mechanism and the parts coöperating therewith are adjusted to the proper heights by the adjustment of the frame D, and on the advancement of the machine the heads of the grain are thrown by the action of the beater-reel into the path of the threshing-surfaces on the cylinders. These cylinders act to bend the standing stalks and to carry the grain-heads partly across the concaves, and at the same time the bars on said cylinders, which constitute the working surfaces thereof, operate on the grain-heads to thresh out the kernels of grain therefrom, without, however, breaking the standing stalk or cutting off the grain-head. The continued advancement of the machine leaves the threshed grain standing in the field and secures the feed of other unthreshed heads of grain into the threshing mechanism. The threshed kernels of grain pass through the spaces of the concaves and lodge upon the riddles, which retain some of the chaff and refuse, while the kernels of grain are free to pass through the perforations or meshes of the riddles. These grain-kernels accumulate in the troughs formed by the bottom 43, and they are moved by the screw conveyers into the compartment 43ª, from whence the threshed grain is delivered by the wing or blade 118 into the buckets of the elevator, from whence this grain is discharged into bags or sacks. It will be understood that the grain is cleaned from chaff or refuse by the air-blast either before its discharge from the elevator or as it falls through the shaking-riddle. The employment of the two threshing-cylinders or the employment of a "divided" cylinder, as it has sometimes been called, is furthermore advantageous because the power for driving the cylinder is divided, inasmuch as such cylinder is driven from one traction-wheel, and this division of the threshing-cylinder and the driving of the sections of the threshing-cylinder from the independent traction-wheels insure greater ease in the machine turning corners of roads, &c.

In Fig. 20 of the drawings we have shown another form of the beater-bar for each cylinder or for each section of a divided cylinder, said beater-bar embracing, essentially, the same features of the bar 184 represented by Fig. 12—that is to say, the bar 210 is provided with a broad smooth face 211 and with corrugations 212, similar to the corresponding surfaces 186 187, respectively, of said bar in Fig. 12; but in addition to these features the bar 210 is equipped with a muffler 213 and with a pliable beater-surface 214, as clearly shown. The muffler is arranged to embrace the thin front edge of the beater-bar, so as to form a flexible surface at the front edge of the bar, which flexible surface will wholly prevent the beater-bar from cutting off the heads of the grain, the latter being an important provision in a machine of our invention and which is especially designed to thresh the grain from the standing stalks without cutting off the heads of the grain. The muffler may consist of a strip or length of leather, rubber fabric, or any other suitable material, which is bent or folded around the thin front edge of the beater-bar, so as to inclose such edge, and the two edges of this folded length of rubber or leather are fastened in any secure way to the beater, while the folded edge of the muffler projects beyond the thin front edge of the beater-bar. The pliable beater-surface also consists of a suitable length of leather, rubber fabric, or other appropriate material, which is arranged in a flat condition at the hind edge of the beater-bar and projects rearwardly a suitable distance therefrom. This pliable beater-surface lies in rear of the threshing-corrugations of the beater-bars 210, and the primary office of this pliable beater-surface 214 is to sweep across the surface of the concave and force the kernels of grain through the slots or openings therein which may lodge upon the bars forming the concaves, whereby the efficiency of the cylinder is promoted.

From practical experiments which we have made it is considered that the guard 71 will be sufficient to prevent any grain from being thrown out of the threshing mechanism by the motion of the rapidly-rotating threshing cylinder or cylinders, because this guard overhangs the upper edge of the concave and is very close to the path of the threshing cylinder or cylinders. To insure the positive retention of the grain in the threshing mechanism, it is proposed to employ the hoods 215 216, as shown by Figs. 21 and 22. Each hood consists of a piece of metal or other appropriate material bent into a segment of a circle and of a length equal to that of the cylinder or cylinder-section. This hood is secured to the rail 72 at the front edge of the overhanging guard, so that the hood may extend in an upward and forward direction from the rail and partially encompass the cylinder or cylinder-section. Each hood serves to catch any grain which owing to the rapid rotation of the cylinder may be thrown beyond the guard, and to conduct the grain properly to the middle portion of the machine we arrange the hoods in reversely-inclined positions, so that the lower ends thereof will be juxtaposed substantially in the plane of the longitudinal axis of the machine, this arrangement of such hoods being indicated more clearly by Fig. 22.

Parts of our invention may be employed without the whole, and changes within the scope of the appended claims may be made in the form and proportion of some of the parts while their essential features are retained and the spirit of the invention is embodied. Hence we do not desire to be limited to the precise form of all the parts as shown, reserving the right to vary therefrom.

No claim is herein made to the means for steering the apparatus from the rear, nor to the divided tongue or pole, nor to any of the parts which coact with said devices, because these features are made the subject-matter of a divisional application which was filed in the United States Patent Office on April 15, 1901, Serial No. 55,833.

Having thus described our invention, what we claim is—

1. In a harvester and thresher, the combination with a wheeled axle, of a vertically-adjustable frame provided at its front portion with a threshing mechanism and at its rear portion with a nut, levers hung on the axle and connected with said frame and provided with nuts, a series of screw-spindles connected with the nuts of the frame and the levers, a hand-operating device, and a common driving connection engaging with said spindles, substantially as described.

2. In a harvester and thresher, the combination with a wheeled axle and a tongue of levers mounted on the axle, a frame suspended from one end of said levers and slidably guided on the axle, a threshing mechanism carried by the frame, nuts on the levers and the frame, spindles pivotally mounted on the frame and engaging with the nuts of the levers, another spindle mounted on the tongue and engaging with the nut on the frame and means for simultaneously rotating all the spindles, substantially as described.

3. In a harvester and thresher, the combination with a wheeled axle, and a tongue, of a vertically-adjustable frame carrying a threshing mechanism, a screw connection between said frame and the tongue, and means for vertically adjusting the frame and connected operatively with the screw connection to actuate the latter simultaneously with adjustment of the frame, substantially as described.

4. In a harvester and thresher, the combination with a wheeled axle, of guide-boxings mounted on the axle, a frame having its upper and lower members connected by guide-rods which are slidably fitted in said guide-boxings, a threshing mechanism on said frame, and means for adjusting the frame in a vertical path, substantially as described.

5. In a harvester and thresher, the combination with a wheeled axle and a tongue of a vertically-adjustable frame carrying a threshing mechanism and provided with a nut, levers linked to the frame and provided with nuts, a spindle mounted on the tongue and connected with the nut of the frame, other spindles mounted on the frame and connected with the nuts of the levers, an adjusting-spindle mounted on the tongue, and an operative connection between the several spindles, substantially as described.

6. In a harvester and thresher, the combination with a wheeled axle, the traction-wheels, and a vertically-adjustable frame, a nut at the rear portion, levers hung on the axle and connected with said frame and provided with nuts, screw-spindles connected with the nuts of the frame and levers, of a divided threshing mechanism having the independent cylinders and concaves carried by the frame in advance of the traction-wheels, and separate driving connections between said independent threshing-cylinders and the traction-wheels, substantially as described.

7. In a harvester and thresher, the combination with a vertically-adjustable frame, a nut at the rear portion, levers hung on the axle and connected with said frame and provided with nuts, screw-spindles connected with the nuts of the frame and levers, and traction-wheels, of a casing carried by said frame in advance of the traction-wheels, and provided with the independent concaves, the cylinders mounted in the casing independently of each other and in operative relation to said concaves, and independent driving connections between said traction-wheels and the cylinders, substantially as described.

8. In a harvester and thresher, the combination with a vertically-adjustable frame, a nut at the rear portion, levers hung on the axle and connected with said frame and provided with nuts, screw-spindles connected with the nuts of the frame and levers, and traction-wheels, of a casing having the independent concaves, the threshing-cylinders mounted on the casing and connected individually with the traction-wheels, the individual grain-conveyers connected operatively with the threshing-cylinders and mounted in said casing below the concaves to transfer the grain to a central point of discharge, and an elevator receiving the grain from said conveyers, substantially as described.

9. In a harvester and thresher, the combination with a vertically-adjustable frame, a nut at the rear portion, levers hung on the axle and connected with said frame and provided with nuts, screw-spindles connected with the nuts of the frame and levers, and traction-wheels, of a casing provided with the concaves, separate cylinders mounted on the casing and individually geared to the traction-wheels, screw conveyers mounted within the casing below the concaves, an elevator, and operative connections from the cylinder-shafts to the screw conveyers and to the elevator, substantially as described.

10. In a harvester and thresher, the combination with a threshing-concave, of a revoluble cylinder having a plurality of threshing-surfaces separated by intervening spaces, each threshing-surface of said cylinder lying in an arc eccentric to the working surface of the concave, and a guard having a front rail overhanging the concave concentric with the path of the bars of the cylinder, substantially as described.

11. In a harvester and thresher, the combination with a threshing-concave, of a revoluble cylinder having threshing-surfaces disposed eccentric to the working surface of the concave, and a guard having a front rail overhanging the concave concentric with the path traversed by the bars of the cylinder, substantially as described.

12. In a harvester and thresher, the combination with a threshing-concave, of a revoluble cylinder having a series of eccentric threshing-surfaces, each formed by a series of bars having the edges thereof presented to the concave, and a guard having a front rail overhanging the concave concentric with the path traversed by the bars of the cylinder, substantially as described.

13. In a harvester and thresher, the combination with a threshing-concave, of a revoluble cylinder having a series of spiders, each provided with heads having faces eccentric to the concave and a series of threshing-bars clamped to said heads, to partake of the eccentric disposition thereof, and to present their edges to the surface of the concave, and a guard having a front rail overhanging the concave concentric with the path traversed by the bars of the cylinder, substantially as described.

14. In a harvester and thresher, the combination with a casing, the concaves, and the revoluble cylinders, of screw conveyers mounted within the casing, and vibratory riddles suspended within the casing between the concaves and said conveyers, and operated by the rotation of the latter, substantially as described.

15. In a harvester and thresher, the combination with the casing, the concaves and threshing-cylinders, of vibratory riddles hung in the casing below the concaves, conveyers mounted in the casing below the riddles, and means carried by the conveyers and disposed to travel therewith between the riddles and the conveyers to vibrate said riddles, substantially as described.

16. In a harvester and thresher, the combination with a casing, a threshing-concave, and a revoluble cylinder, of a guard overhanging the concave and disposed out of the path of the cylinder, and a front rail on said guard eccentric with the acting face of the concave, substantially as described.

17. In a harvester and thresher, the combination with a casing, and a thresher mechanism and the directing-fingers, of a deflecting-roll beneath said fingers and arranged in advance of the casing and below the plane of the threshing mechanism, substantially as described.

18. In a harvester and thresher, the combination with a threshing mechanism, having the spaced cylinders and concaves, of an elevator mechanism situated substantially at the line of separation of the concaves of the cylinders, the oppositely-movable conveyers arranged to deliver the grain to a common point, and a rotary wing between said conveyers carried by the inner end of the shaft of one of the conveyers and adapted to deliver the grain to the elevator, substantially as described.

19. In a harvester and thresher, the combination with a threshing mechanism, and an elevator, of a blast mechanism in operative relation to the elevator, and having a fan and a discharge-conduit situated on opposite sides of the elevator, substantially as described.

20. In a harvester and thresher, the combination with a threshing mechanism and grain-conveyers, of blast-pipes in advance of said conveyers, and blast-fans driven independently by suitable power connections and connected with said blast-pipe, substantially as described.

21. A beater-bar for a threshing mechanism having a muffler in advance of its working surface, as and for the purposes described.

22. A beater-bar for a threshing mechanism having a pliable muffler inclosing the thin front edge of said bar and disposed in operative position and in advance of the active surface of said bar, substantially as described.

23. In a combined harvester and thresher, the combination with a cylinder, and a concave, of a guard, and a hood extending from the guard and partly inclosing the cylinder, substantially as described.

24. In a combined harvester and thresher, the combination with the concaves, and the cylinders, of hoods partly inclosing the cylinders and inclined toward each other, substantially as described.

In witness whereof we have hereunto set our hands in the presence of two witnesses.

WILLIAM MALONEY.
ELZEAR DORÉ.
JOSEPH DORÉ.

Witnesses:
H. I. BERNHARD,
JOS. J. O'NEILL.